Nov. 3, 1936.    J. J. RING    2,059,656
BUTTERFLY VALVE
Filed Dec. 21, 1935    2 Sheets-Sheet 2

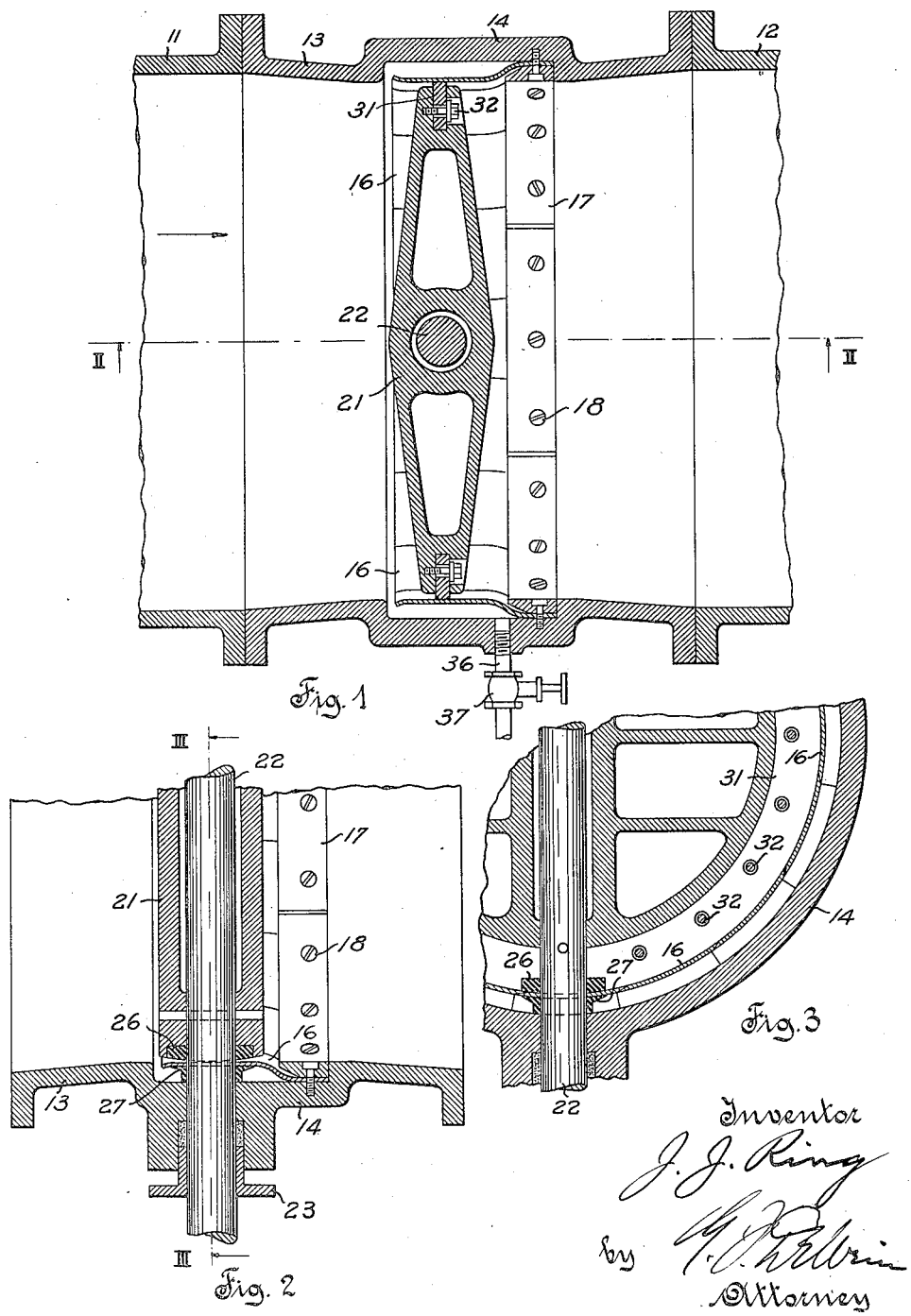

Inventor
J. J. Ring
by
Attorney

Patented Nov. 3, 1936

2,059,656

UNITED STATES PATENT OFFICE 2,059,656

BUTTERFLY VALVE

Joseph J. Ring, Wauwatosa, Wis., assignor to Allis-Chalmers Manufacturing Company, Milwaukee, Wis., a corporation of Delaware Application December 21, 1935, Serial No. 55,582

15 Claims. (Cl. 251—11)

This invention relates to improvements in the construction of valves and particularly to improvements in means for packing or sealing the periphery of butterfly valves and similar shut off devices against leakage between the valve disk or wicket and its seat when such valve body is in the closed position.

The increasing volumes of water to be controlled in modern water supply and hydroelectric projects requires the use of butterfly valves which are being developed in constantly larger sizes. The increasing size of such valves adds to the inherent difficulty of sealing thereof when in the closed position and particularly when under high pressure. Such valves must, however, be provided with seals which avoid, or at least, reduce leakage through the valve structure to such extent as to be tolerable when equipment downstream from the valve is to be unwatered for any reason. The valve seals must therefore be of such nature as to provide a tight seal for the valve regardless of the difference of pressure between the conduit portion upstream of the valve and the pressure in the conduit portion downstream of the valve. Such seals must also be so constructed and of such material as to be substantially unaffected by the content of the water flowing in the conduit, whether such content be abrasive or corrosive in character. It is highly desirable that all sealing means be contained wholly within the valve casing without the necessity for providing external means for adjustment or for making such seals effective. Such seals also must be readily replaceable if the seal becomes defective by reason of accident, fatigue due to aging, or ordinary abrasion or corrosion due to the repeated operation of the valve or to the content of the water. The sealing means should be flexible and resilient to avoid jamming of the valve under any conditions and to minimize the wear due to the action of the valve as well as to compensate for such wear as is unavoidable. Some solids are always carried in suspension by the water flowing through conduits of the size requiring butterfly valves and such solids sediment when closing of the valve interrupts the flow of the water. Such sedimentation is particularly disadvantageous when flexible seals are used because the collected sediment hinders flexure of the sealing elements and impairs or prevents their sealing action.

It is therefore an object of the present invention to provide means for sealing valves when in the closed position and in which the means are increasingly effective as the pressure on the upstream side of the valve increases.

Another object of the invention is to provide sealing means for valves in which the sealing means are wholly contained within the valve casing and do not require external means to adjust the seal or to make such seal operative to its maximum extent.

Another object of the invention is to provide a seal for valve structures in which the sealing means are constructed of a plurality of elements which are severally removable and replaceable without interference with other elements of the sealing means or with other portions of the valve structure.

Another object of the invention is to provide sealing means for valves in which the sealing means will prevent jamming of the valves and will compensate for wear while retaining their original maximum effectiveness over substantially the entire life of the seal.

Another object of the invention is to provide a seal for valve structures in which the sealing means are so constructed as to allow for the separation and discharge of sedimented material collecting on the upstream side of the closed valve.

Objects and advantages other than those above set forth, will be apparent from the following description when read in connection with the accompanying drawings, in which:

Fig. 1 is a vertical sectional view taken through a portion of a water carrying conduit showing inserted therein a valve of the butterfly type provided with sealing means embodying the present invention;

Fig. 2 is a partial sectional view taken on the plane II—II of Fig. 1 in the direction of the arrows shown thereon;

Fig. 3 is a partial sectional view taken on the plane III—III of Fig. 2 in the direction of the arrows shown thereon;

Figure 4:
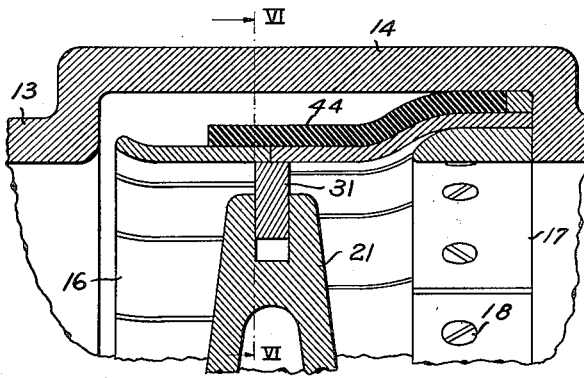
Fig. 4 is a partial vertical sectional view taken on the plane of line IV—IV of Fig. 5, similar to that shown in Fig. 1 and illustrating a modified form of the sealing means of the present invention.

Referring more particularly to the drawings by characters of reference, the reference numerals 11 and 12 designate upstream and downstream portions respectively, of a conduit for carrying water. The conduit portions are joined by a section of conduit 13 of substantially the same cross sectional area as that of conduit 11, 12 and forming a casing for a valve. The valve casing section 13 is formed with a portion 14 of enlarged diameter to provide a channel interiorly thereof within which are arranged a plurality of segments 16 of a substantially cylindrical seal structure which is held within the channel 14 by a segmental ring 17 attached to the casing 13 by studs 18 threaded into the casing. The several segments 16 are shaped as shown and are clamped at one end thereof against the casing 13 by the ring 17 and extend into the channel 14 in spaced relation thereto. The segments 16 are preferably made of some flexible and resilient material such as spring steel, flexible copper or bronze, or other suitable material and are provided with beveled edges or edges forming half lap joints at the abutting ends to secure suitable water tight joints around the periphery of the cylinder formed thereby. The cylinder formed by the segments 16 is slightly smaller, intermediate its ends, in diameter than the valve disk or wicket 21 so that movement of the disk into the position shown exerts an expanding force on the segmental cylinder 16 to force the abutting edges of the segments tightly together. It will be seen that the free end of the cylinder formed by the segments 16 is suitably enlarged to allow free entry of the valve disk 21 thereinto and that the ring 17 has one edge thereof beveled for a purpose which will appear hereinafter. The valve disk or wicket 21 is mounted on a shaft 22 extending through the casing 13, through suitable sealing glands 23, and is connected exteriorly of the casing with operating means of any of the usual types and therefore not shown. Annular blocks 26 of suitable resilient material such as rubber are set into each side of the valve disk 21 around the shaft 22 and bear on the sealing cylinder 16 against similar blocks 27 arranged around the shaft between the sealing cylinder 16 and the casing channel 14. The blocks cooperate with the sealing cylinder in precluding any possibility of leakage around the shaft, for the reason that such blocks are always under some compression regardless of the position of the valve.

The valve disk 21 is provided with a groove around the periphery thereof into which are set a plurality of segmental rings 31 which may be made in as many segments as is desirable and which are adjustably retained within the groove by studs 32 extending through the ring 31 and threaded into the body of the valve disk. Rings 31 are made adjustable within the groove to permit concentric location thereof, when the valve disk is in the closed position, relative to the sealing cylinder 16 or to permit any other adjustment of the rings relative to the seal that may be desired. The seal cylinder and the valve rings cooperate to provide the engaging and sealing surfaces of the valve whereby any inaccuracies in manufacture may be compensated for by proper adjustment of the valve disk ring.

Assuming that the water is flowing through the conduit 11, 12 in the direction indicated by the arrow, that is, from the conduit section 11 through the valve casing 13 into the conduit section 12, the pressure of the water under the sealing cylinder 16 tends to raise the segments thereof to compress the cylinder 16 which is therefore seated more tightly against the blocks 26 and the rings 31 dependent on the pressure. Any sand, grit or other water borne material which would have a tendency to be dropped or sedimented adjacent the valve disk 21 is collected in the channel 14 under the cylinder 16 and thus kept away from the true seat of the disk formed by the ring 16. Such collection of sand, etc. is then drawn off through a pipe 36 connected with the channel 14 at the lowermost point thereof, and provided with a suitable shutoff valve 37.

Figure 5:
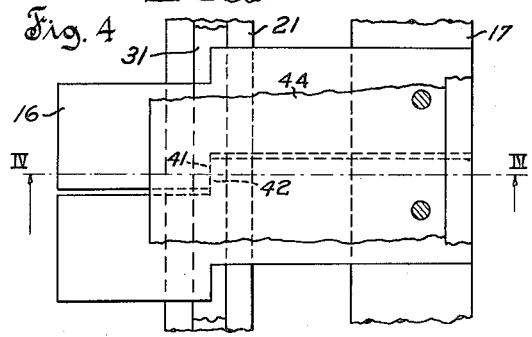
Fig. 5 is a partial plan view showing particularly a portion of the peripheral surfaces of the sealing means on the side thereof adjacent the valve casing.
Figure 7:
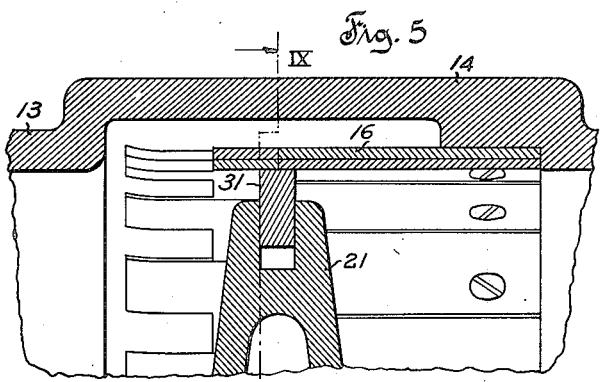
Fig. 7 is a view similar to the view shown in Fig. 4 and is taken on the plane of line VII—VII of Fig. 8 to aid in illustrating a further modification of sealing means for a valve.

When the sealing means is formed as a single set of seal segments 16 arranged in cylindrical form, the several segments are preferably shaped as shown in Fig. 5 with the upstream ends of such segments offset relative to ends of such segments which are retained under the ring 17. The peripheral surfaces of such segments which are in contact as shown at 41 and 42 are then so located as to come under disk ring 31 and are so shaped as to remain in contact with each other continuously regardless of the degree of expansion of the cylinder formed by the seal segments 16. Any tendency for leakage through the joints between the seal segments on longitudinal lines parallel with the axis of the valve casing 13 is thus prevented by the contacting surfaces 41 and 42. Any leakage through the seal in directions radial to the casing 13 is prevented by the use of a rubber backing 44 formed to the shape of the outer surface of the seal segments and of such size as to hold the same under slight compression. The end of the rubber backing ring is clamped between the valve casings 13 and the seal segments 16 by the retaining ring 17 thus adding the resiliency of the rubber to that of the seal segments to press the seal structure tightly against the valve disk. As modified, the resilient seat for the valve disk, thus provides positive sealing against leakage both longitudinally due to the shape of the segments 16 and radially due to the rubber backing 44 which extends upstream of the line of contact between the seal and the ring 31 in the valve disk.

Figure 6:
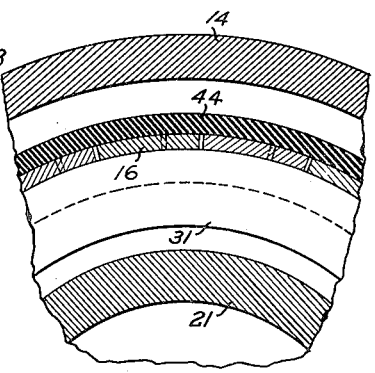
Fig. 6 is a vertical sectional view taken on the plane of line VI—VI of Fig. 4 to illustrate the cooperative arrangement of the several portions of the modified sealing means.
Figure 9:
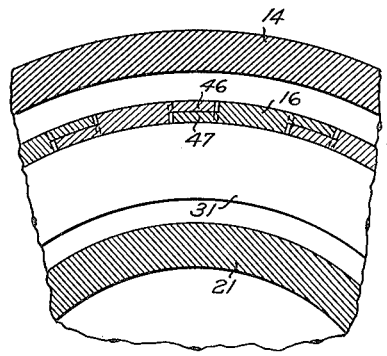
Fig. 9 is a view taken on the plane of line IX—IX of Fig. 7 to aid in illustrating the second modification of the sealing means.
Figure 8:
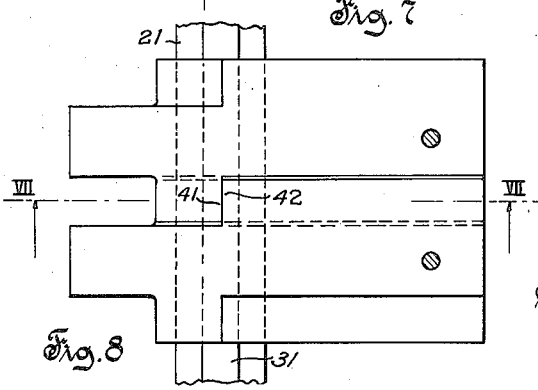
Fig. 8 is a view similar to that shown in Fig. 5 to aid in illustrating the second modification of the sealing means.

If it is desired to provide the same degree of sealing as is obtained in Figs. 4, 5, and 6 but without the use of rubber, the several sealing segments are preferably made with both the offset portions to provide contact surfaces 41 and 42 extending peripherally of the seal structure and in the shape shown in Fig. 8 and are also made to provide half lap joints in a direction longitudinally of the valve casing 13 as shown at 46 and 47 in Fig. 9. Such half lap joints then provide the contact surfaces 46 and 47 which prevent leakage through the seal structure radially of the casing just as when the rubber backing ring is used.

It will thus be seen that means are provided by which the upstream pressure on the valve is utilized in aiding the sealing action and that the sealing action is actually greater, the greater the differences in pressure between the upstream and downstream sides of the valve. Being resilient and flexible under all conditions, wear on the sealing means is minimized and the sealing means are so constructed as to segregate and permit discharge from the conduit of abrasive sedimenting material which might cause such wear. The seal is wholly contained within the valve housing and is equally effective at all points around the periphery of the valve without adjustment of any kind during the life of the seal.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. A valve structure comprising a casing having a channel formed therein, a seat member formed of a plurality of flexible members arranged around said casing within the channel therein and spaced therefrom to allow access of fluid pressure to the rear side of said seat member, and a valve body mounted for movement into engagement with said seat member.

2. A valve structure comprising a casing, a plurality of flexible segments arranged substantially entirely around said casing to form a substantially continuous cylindrical seat member in spaced relation with said casing to allow access of fluid pressure to the rear side of said seat member, said segments being formed with interengaging surfaces in a plurality of planes, and a valve body mounted for movement into engagement with said seat member.

3. A butterfly valve comprising a casing having a channel formed therein; a seat member formed of a plurality of flexible segments, a ring securing one end of the segments within the channel, and a ring of resilient water impervious material arranged around the segments, said seat member extending into the channel to allow access of fluid pressure to the rear side thereof; and a shaft extending through said casing, and a valve disk mounted on said shaft for rotation into engagement with said seat member.

4. A butterfly valve comprising a casing having a channel formed therein, a seat member formed of a plurality of flexible segments, a ring securing one end of said seat member within and against one side of said channel, said seat member extending into the channel into spaced relation therewith to allow access of fluid pressure to both sides of said seat member, a shaft extending through said casing, and a valve disk mounted on said shaft for rotation into and out of engagement with said seat member.

5. A butterfly valve comprising a casing having an annular channel formed therein, a seat member formed of a plurality of flexible interengaging segments, a segmental ring securing one end of said seat member within the channel, said seat member extending in spaced relation into the channel to allow access of fluid pressure to both sides of said seat member, resilient means arranged in the channel about the segments to exert a compressive action thereon, a shaft extending through said casing, and a valve disk mounted on said shaft for rotation into and out of engagement with said seat member.

6. A butterfly valve comprising a substantially cylindrical casing having an annular channel formed therein, a substantially cylindrical seat member formed of a plurality of flexible interengaging segments, a segmental ring securing one end of said seat member within the channel, said seat member extending in spaced relation into the channel to allow access of fluid pressure to the rear side thereof, a shaft extending in sealed relation into said casing, and a valve disk mounted on said shaft for rotation thereby within and into and out of engagement with said seat member.

7. A valve structure comprising a casing, a shaft extending into said casing, a valve body mounted within said casing on said shaft for oscillatory movement thereby, a plurality of flexible segments arranged within said casing in spaced relation thereto and in the plane of said shaft to form continuous substantially semi-cylindrical seat members, and resilient and compressible means arranged about the portions of said shaft between said casing and said valve body and cooperating to join the ends of said seat members to prevent flow of fluid about said shaft.

8. A valve structure comprising a casing, a shaft extending into said casing, a valve body mounted within said casing on said shaft for oscillatory movement thereby, a plurality of flexible segments arranged within said casing in spaced relation thereto and in the plane of said shaft to form continuous substantially semi-cylindrical seat members, a ring of resilient material enclosing said seat members to aid in preventing leakage therethrough, and a plurality of blocks of resilient material arranged about each end of said shaft and on each side of said semi-cylindrical seat members within said casing to join the ends thereof to prevent the flow of fluid about said shaft.

9. A valve structure comprising a casing, a shaft extending into said casing, a valve body mounted within said casing on said shaft for oscillatory movement thereby, a plurality of flexible segments arranged within said casing in spaced relation thereto and in the plane of said shaft to form continuous substantially semi-cylindrical seat members, an annular block of resilient material arranged about each end of said shaft between said valve body and said seat members, and an annular block of resilient material arranged about the end of said shaft between said casing and said seat members, said blocks being arranged in pairs cooperating to join the ends of said semi-cylindrical seat member to prevent leakage of fluid about said shaft when said valve body is in closed position.

10. A butterfly valve structure comprising a casing, a plurality of flexible segments secured within and substantially entirely around said casing to form a substantially continuous cylindrical seat member in spaced relation with said casing to allow access of fluid pressure to the rear side of said seat member, a shaft extending through said casing, a valve mounted on said shaft for oscillation thereby into and out of engagement with said seat member, the edge of said valve disk being provided with a groove, and adjustable means arranged in the groove of said disk to cooperate with said seat member in forming a fluid tight seal upon seating of said valve disk.

11. A butterfly valve structure comprising a casing, a plurality of flexible segments secured within and substantially entirely around said casing to form a substantially continuous cylindrical seat member in spaced relation with said casing to allow access of fluid pressure to both sides of said seat member, a shaft extending through said casing, a valve mounted on said shaft for oscillation thereby into and out of engagement with said seat member, the edge of said valve disk being provided with a groove, and a plurality of segmental rings adjustably mounted in the groove of said disk to cooperate with said seat member in forming a fluid tight seal in seating of said valve disk.

12. A butterfly valve structure comprising a casing, a plurality of flexible segments arranged within said casing in spaced relation thereto and in the plane of said shaft to form continuous substantially semi-cylindrical seat members, a shaft extending through said casing, a valve disk mounted on said shaft for oscillation thereby into and out of engagement with said seat member, the edge of said valve disk being provided with a groove, a plurality of blocks of resilient material arranged about each end of said shaft and on each side of said semi-cylindrical seat member to join the ends thereof to prevent flow of fluid about said shaft, and a plurality of segmental rings adjustably mounted in the groove in said disk to cooperate with said seat members and with said blocks in forming a fluid tight seal upon seating of said valve disk.

13. A valve structure comprising a casing subject to collecting of sedimenting solids therein, a flexible seat member formed within said casing and having the flexibility thereof impaired upon occurrence of such sedimentation, a valve body movable into and out of engagement with said seat member, and means for discharging the sedimented solids from about said seat member.

14. A valve structure comprising a casing having an annular channel therein, a seat member formed of a plurality of flexible sections arranged within the channel and in spaced relation thereto, the space between said casing and said seat member being open in the direction opposite to the direction of the flow of fluid through said casing and being subject to sedimenting of solids therein, a valve body movable into and out of engagement with said seat member, and means for discharging the sedimented solids from the space between said casing and said seat member to avoid impairment of the flexing action thereof.

15. A valve structure comprising a casing having an annular channel therein, a seat member formed of a plurality of flexible sections arranged within the channel and in spaced relation thereto, the space between said casing and said seat member being open in the direction opposite to the direction of the flow of fluid through said casing and being subject to sedimenting of solids therein, a valve body movable into and out of engagement with said seat member, a conduit connecting the space between said casing and said seat member with the exterior of the valve structure, and a valve connected in said conduit to control discharge of solids sedimented in the space between said casing and said seat member.

JOSEPH J. RING.